US010848497B2

(12) United States Patent
Castellanos Zamora et al.

(10) Patent No.: US 10,848,497 B2
(45) Date of Patent: Nov. 24, 2020

(54) METHODS AND APPARATUSES FOR HANDLING SERVICE PROFILE DATA FOR A USER

(71) Applicant: Telefonaktiebolaget LM Ericsson (publ), Stockholm (SE)

(72) Inventors: David Castellanos Zamora, Madrid (ES); Göran Hall, Mölndal (SE); Angel Navas Cornejo, Leganes (ES); Stefan Rommer, Västra Frölunda (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/481,373

(22) PCT Filed: Mar. 3, 2017

(86) PCT No.: PCT/EP2017/055005
§ 371 (c)(1),
(2) Date: Jul. 26, 2019

(87) PCT Pub. No.: WO2018/157939
PCT Pub. Date: Sep. 7, 2018

(65) Prior Publication Data
US 2019/0394633 A1 Dec. 26, 2019

(51) Int. Cl.
*H04W 4/00* (2018.01)
*H04L 29/06* (2006.01)
*H04W 8/04* (2009.01)
*H04W 8/20* (2009.01)
*H04W 60/04* (2009.01)
*H04W 12/08* (2009.01)

(52) U.S. Cl.
CPC ............ *H04L 63/102* (2013.01); *H04W 8/04* (2013.01); *H04W 8/20* (2013.01); *H04W 12/0808* (2019.01); *H04W 60/04* (2013.01)

(58) Field of Classification Search
CPC ......... H04W 8/20; H04W 8/04; H04W 12/06; H04W 12/08; H04W 60/04
See application file for complete search history.

(56) References Cited

PUBLICATIONS

International Search Report and Written Opinion dated Oct. 27, 2017 for International Application No. PCT/EP2017/055005 filed on Mar. 3, 2017, consisting of 13-pages.
3GPP TR 23.799 V14.0.0; 3rd Generation Partnership Project; Technical Specification Group Services and System Aspects; Study on Architecture for Next Generation System (Release 14), Dec. 2016, consisting of 522-pages.
3GPP TS 23.502 V0.1.1; 3rd Generation Partnership Project; Technical Specification Group Services and System Aspects; Procedures for the 5G System; Stage 2 (Release 15), Jan. 2017, consisting of 46-pages.

(Continued)

*Primary Examiner* — Charles T Shedrick
(74) *Attorney, Agent, or Firm* — Patent Portfolio Builders, PLLC

(57) ABSTRACT

The present invention faces the issue of introducing a new direct interface NG10, between a unified data management function and a session management function in a HPLMN, i.e., a home SMF, in order to obtain a service profile for a UE, at the home SMF from the UDM, and provides for the home SMF obtaining such service profile from a policy control function via the existing NG7 interface.

18 Claims, 12 Drawing Sheets

(56) References Cited

PUBLICATIONS

3GPP TS 23.501 V0.1.0; 3rd Generation Partnership Project; Technical Specification Group Services and System Aspects; System Architecture for the 5G System; Stage 2 (Release 15), Jan. 2017, consisting of 67-pages.

SA WG2 Meeting #119 S2-171456; Title: Update PDU session establishment; Source: CATT; Document for : Approval; Agenda Item: 6.5.3; Location and Date: Dubrovnik, Croatia, Feb. 13-17, 2017, consisting of 5-pages.

SA WG2 Meeting #119 S2-171068; Title: 23.501: PDU session mobility between N3GPP access and 5G-RAN; Source: ETRI; Document for : Approval; Agenda Item: 65.10; Location and Date: Dubrovnik, Croatia, Feb. 13-17, 2017, consisting of 4-pages.

SA WG2 Meeting #118BIS S2-170679; Title: 23.501: SMF selection; Source: Ericsson, Huawei, CATT; Document for : Approval; Agenda Item: 6.5.3; Location and Date: Spokane, WA, USA, Jan. 16-20, 2017, consisting of 3-pages.

Sa WG2 Meeting #118bis S2-170308; Title: Subscriber Data management between AMF and UDM; Source: Huawei, HiSilicon; Document for : Approval; Agenda Item: 6.10.3; Location and Date: Spokane, WA, USA, Jan. 16-20, 2017, consisting of 3-pages.

SA WG2 Meeting #118 S2-167226; Title: Updates to Agreement on the overall architecture; Source: Nokia, Alcatel-Lucent shanghai Bell, Verizon, Mediatek, T-Mobile USA, Intel, Ericsson, Cisco, LGE, Samsung, Sprint, China Mobile, Telecom Italia, AT&T, CATR, ZTE, Huawei, NICT, Deutsche Telekom, NEC, BT, Vodafone, ETRI; Document for : Approval; Agenda Item: 6.10.22; Location and Date: Reno, Nevada, USA, Nov. 14-18, 2016 consisting of 12-pages.

SA WG2 Meeting #118 S2-167152; Title: Agreement on how SMF accesses to subscription data; Source: Nokia, Alcatel-Lucent shanghai Bell, LGE; Document for : Approval; Agenda Item: 6.10.4; Location and Date: Reno, Nevada, USA, Nov. 14-18, 2016 consisting of 5-pages.

3GPP TR 23.799 V1.2.0; 3rd Generation Partnership Project; Technical Specification Group Services and System Aspects; Study on Architecture for Next Generation System (Release 14), Nov. 2016, consisting of 532-pages.

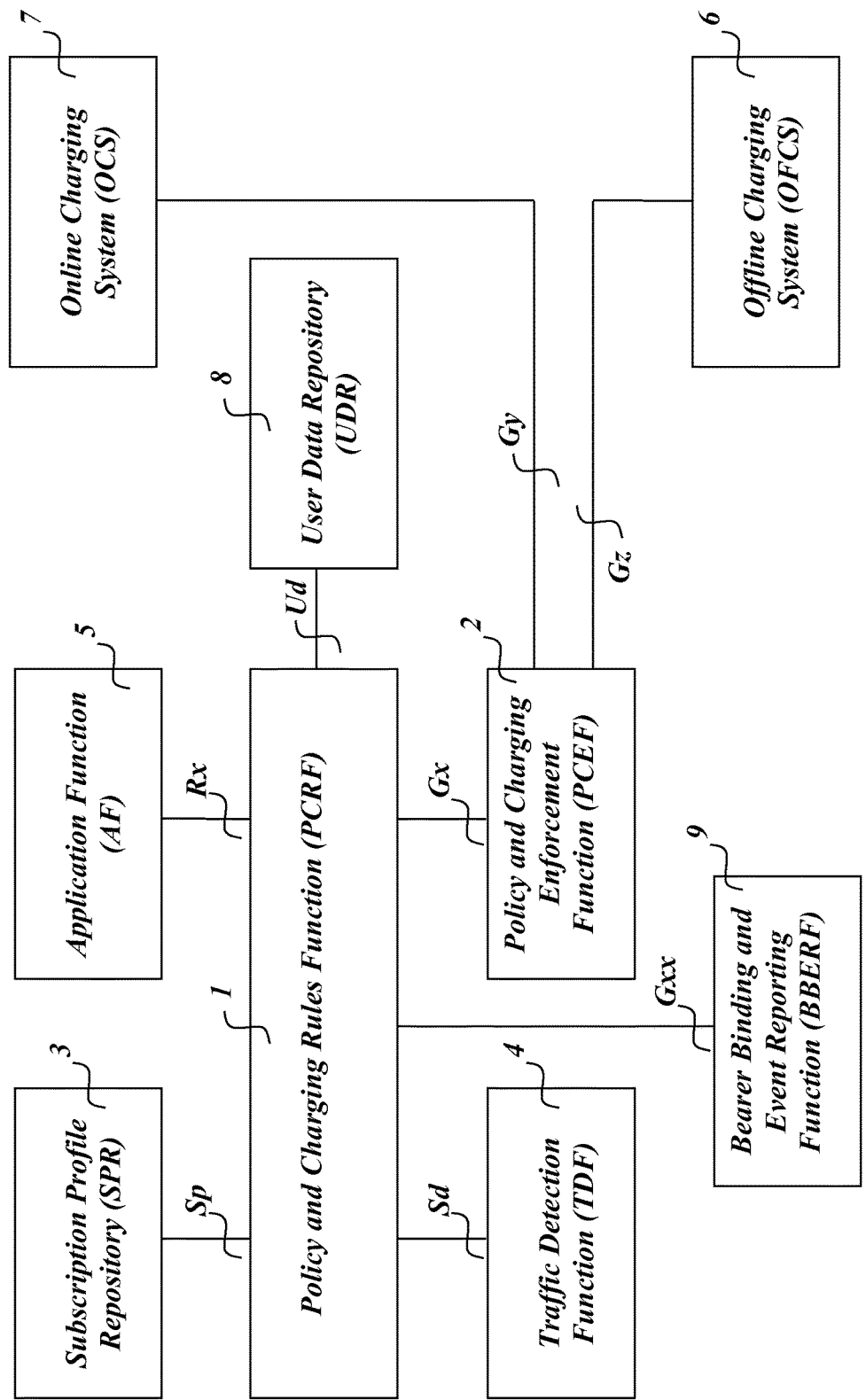
FIG. -1-

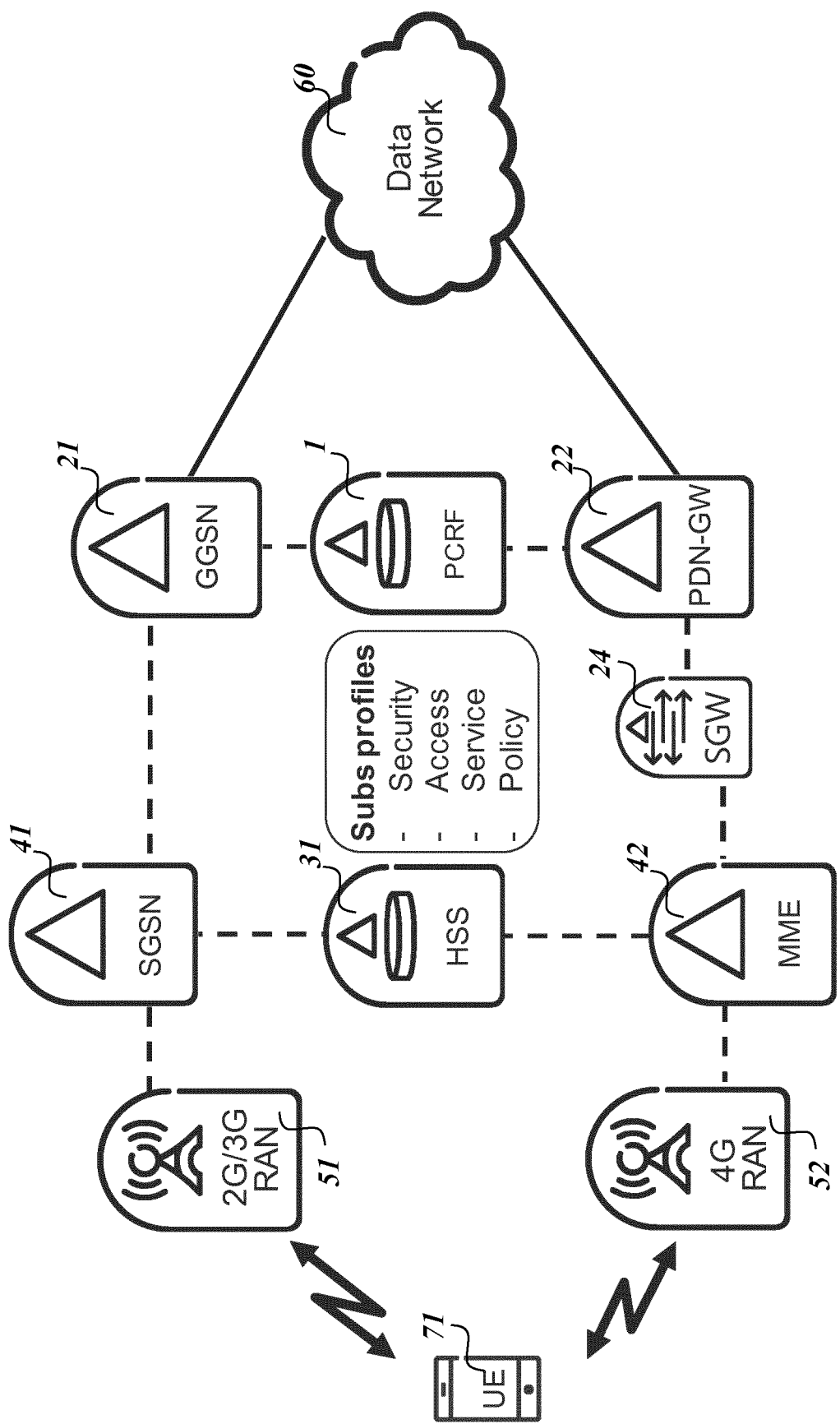
FIG. -2-

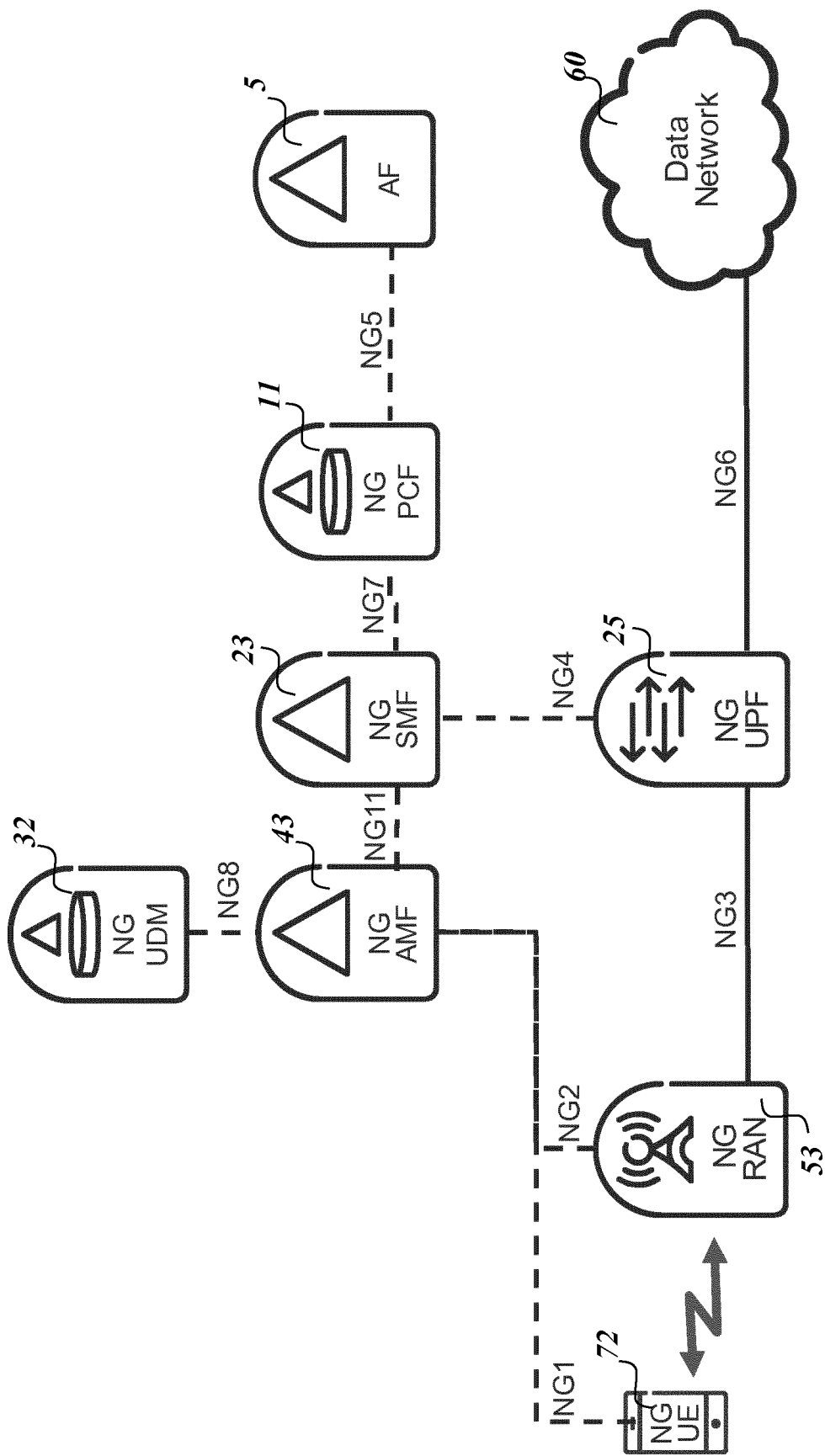
FIG. -3-

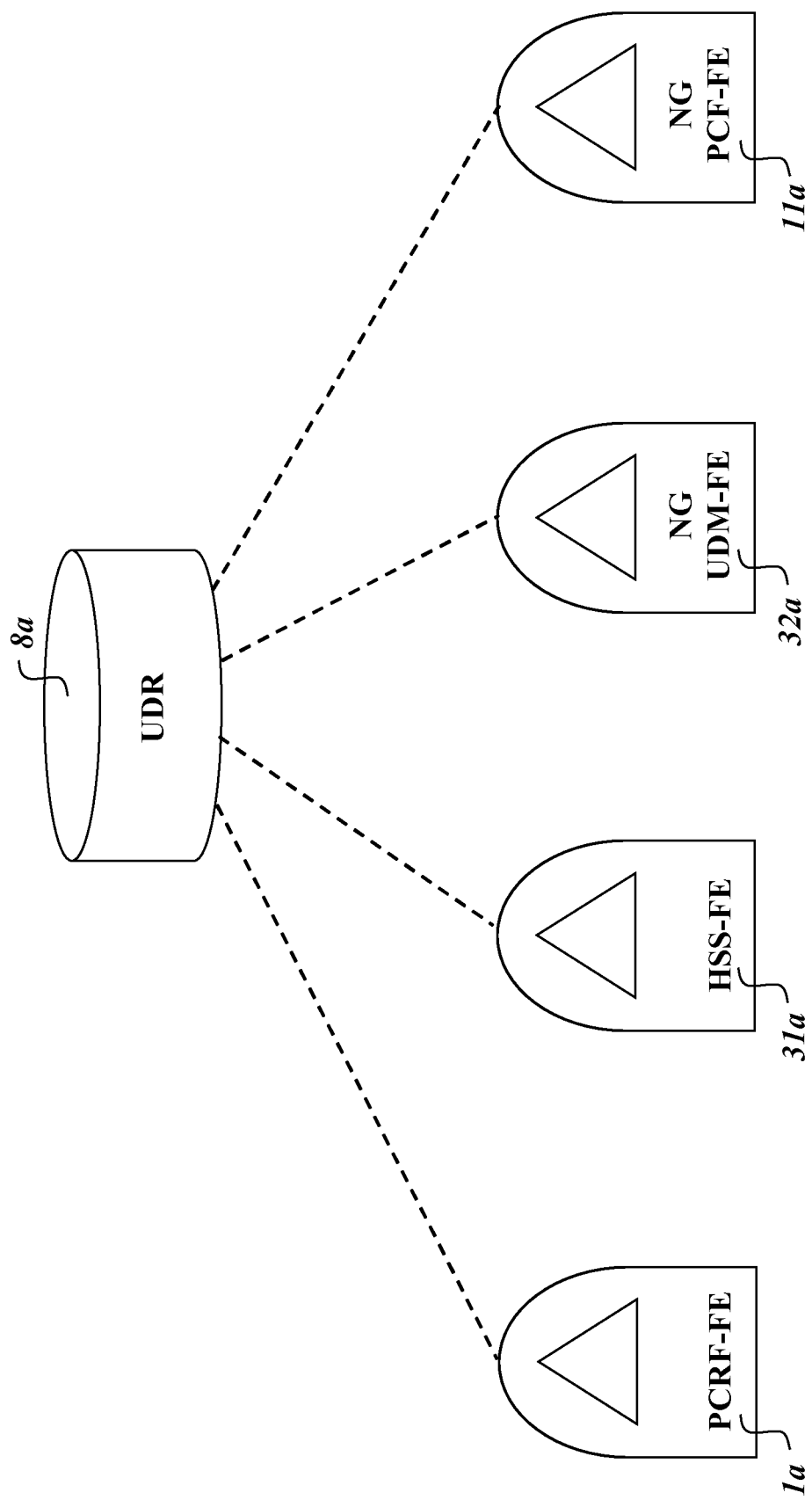
FIG. -4-

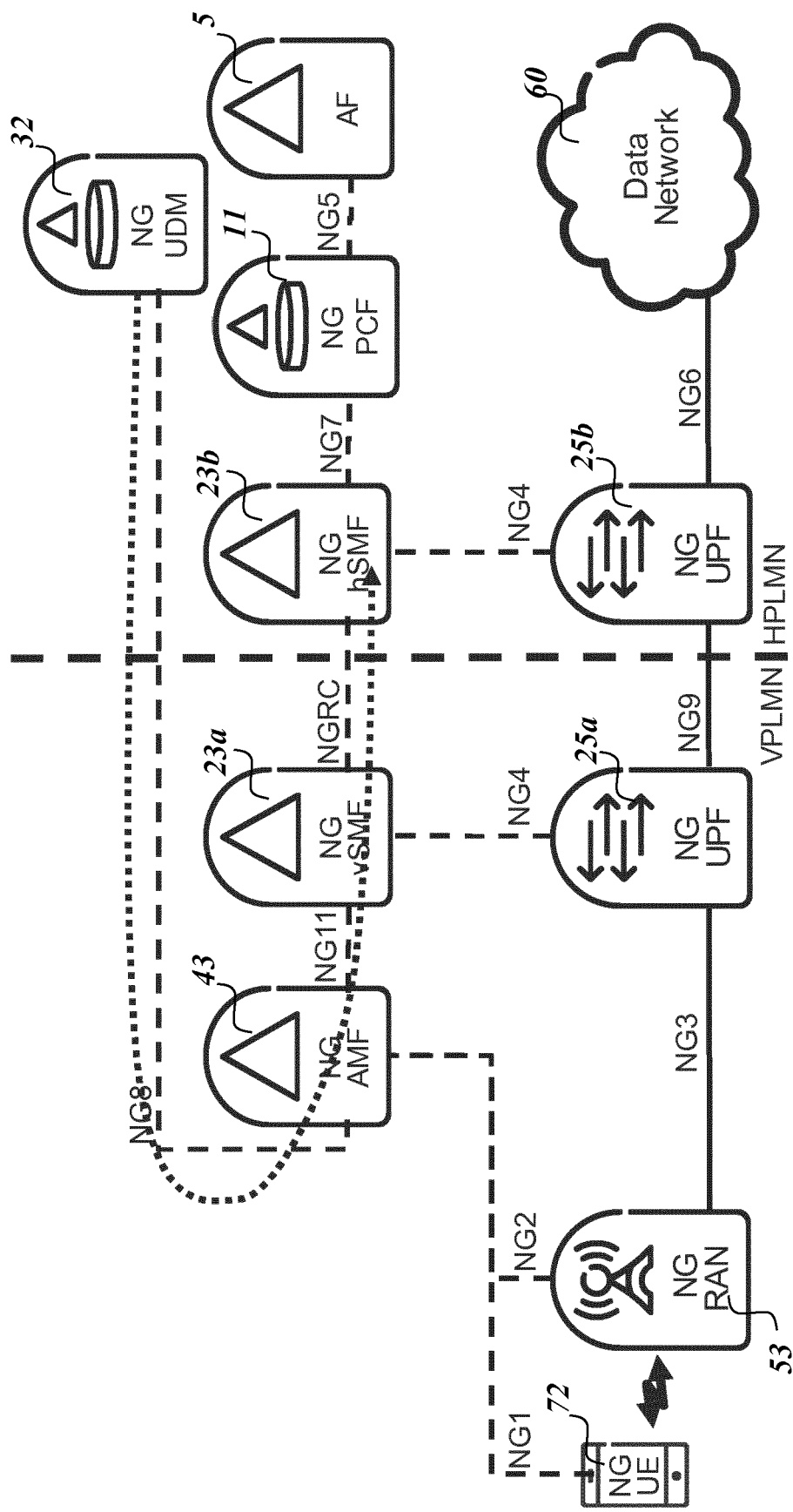
FIG. -5-

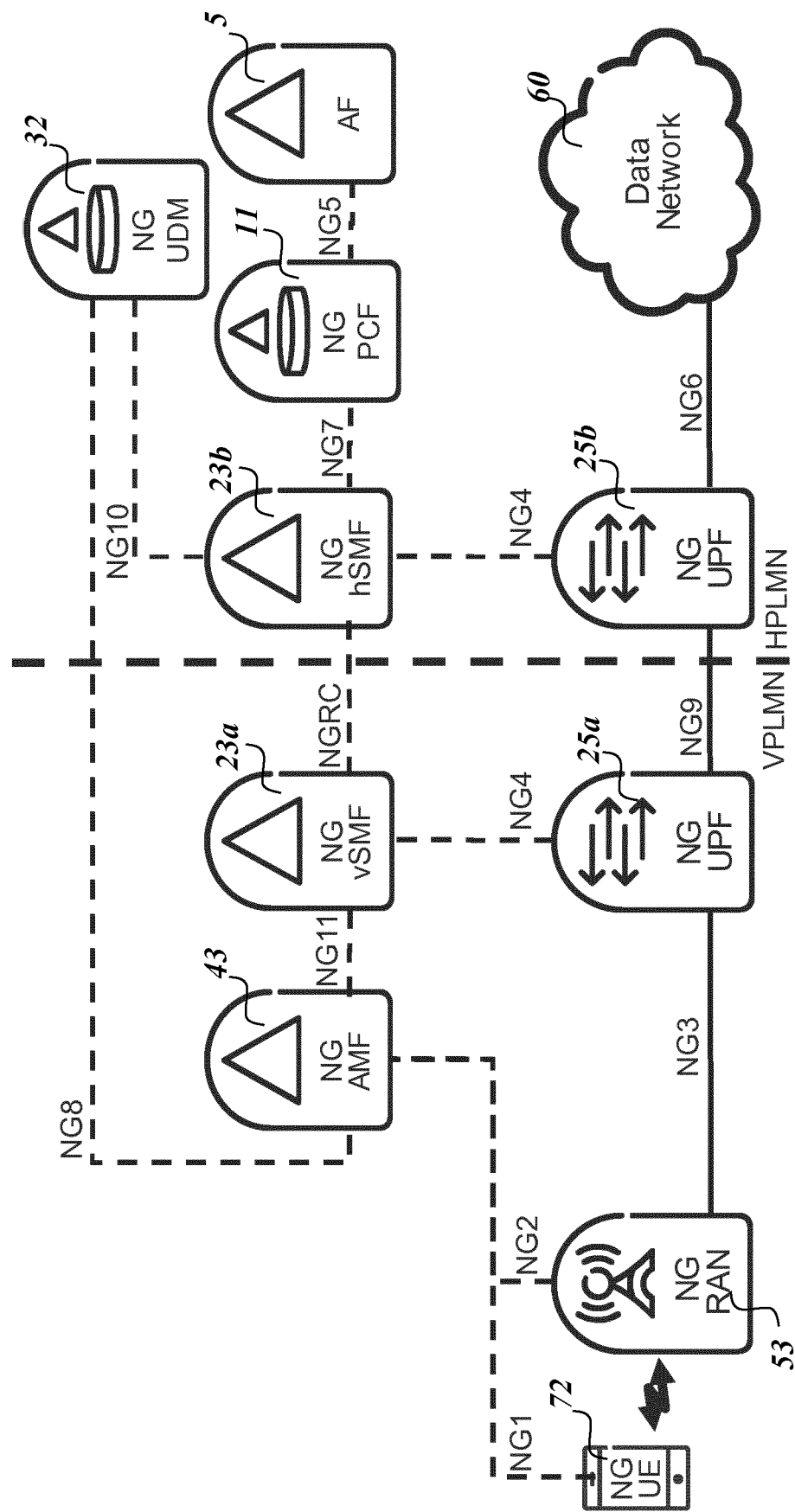
FIG. -6-

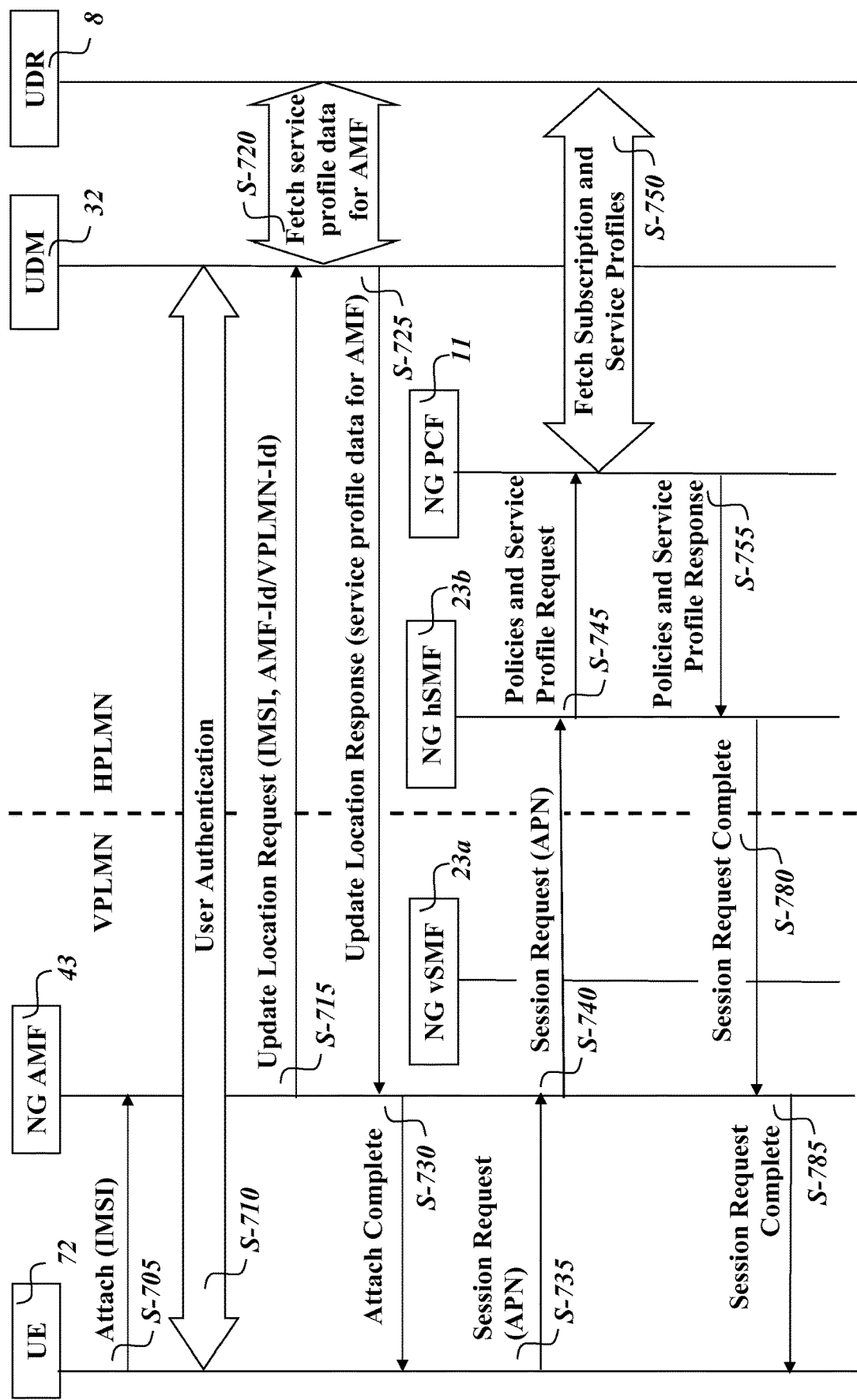
FIG. -7-

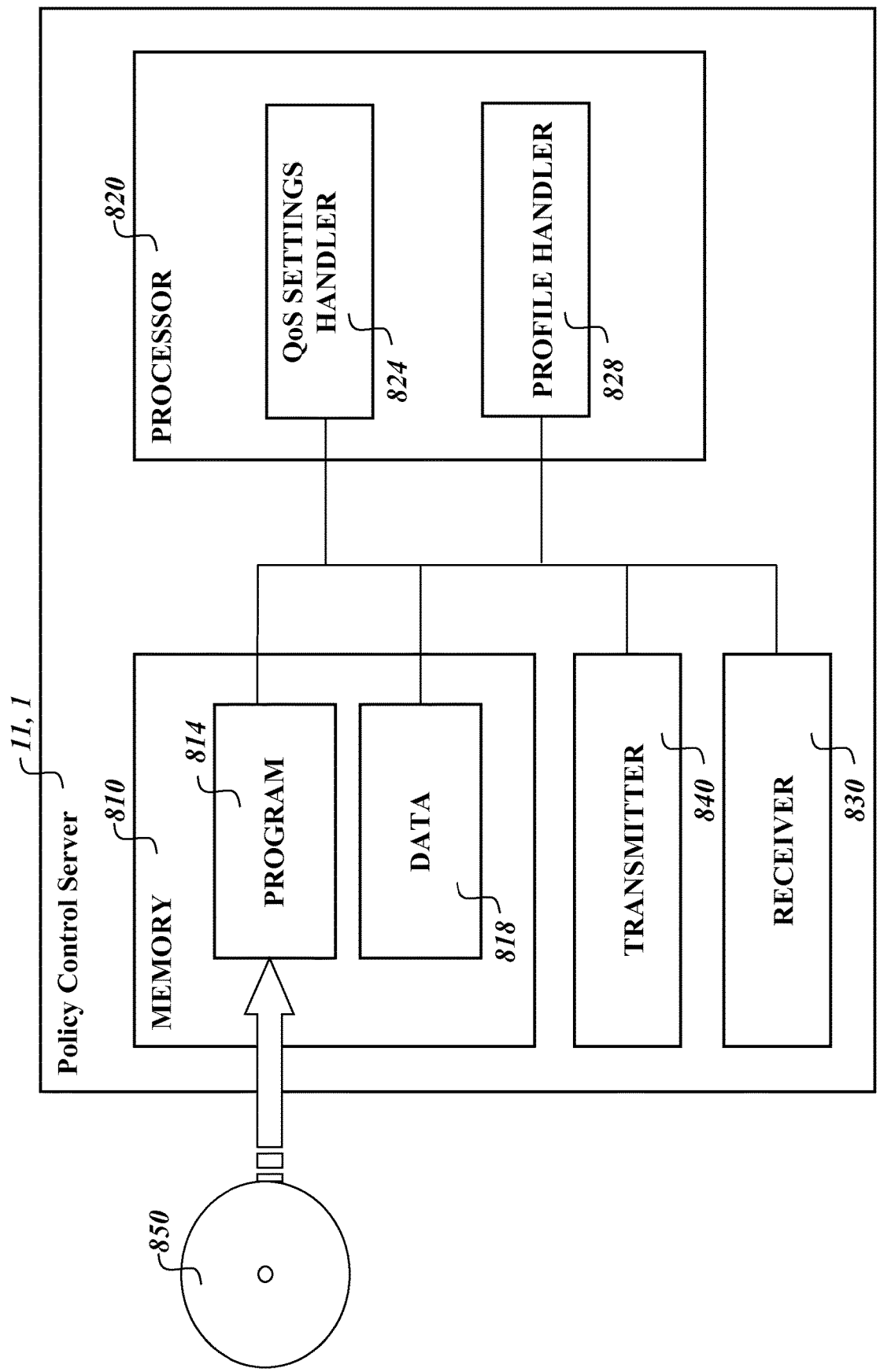
FIG. -8-

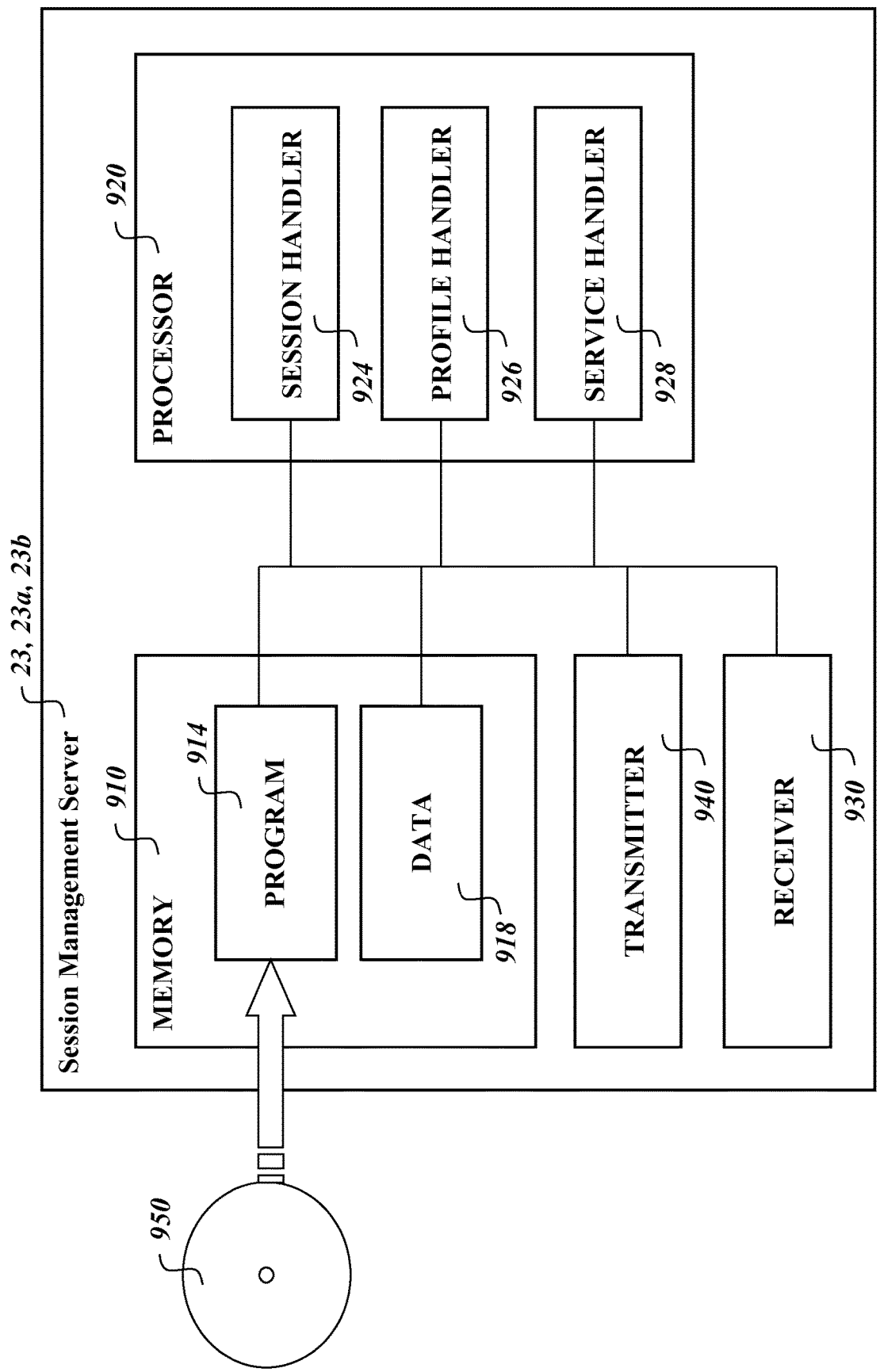
FIG.-9- determining, at a UDM and during attach of the UE with the network, a set of data in a service profile for the UE, the set of data being usable to select an SMF for executing a service at the home network, hereinafter referred to as a home SMF  
S-1010 transmitting, from the UDM toward an AMF, and receiving at the AMF, the set of data in the service profile for the UE  
S-1020 selecting, at the AMF upon receiving a session request from the UE and based on the received set of data, the home SMF for executing the service at the home network  
S-1030 transmitting, from the AMF toward the selected home SMF, and receiving at the home SMF, the session request for the UE  
S-1040 obtaining, at the home SMF from a PCF, a service profile for the UE, the service profile usable for the UE executing a service at the home SMF  
S-1050 executing, at the home SMF, the service for the service request in accordance with the service profile obtained for the UE  
S-1060

FIG. -10- receiving, at the SMF from an AMF, a session request for executing a service at the home network for the UE
S-1110 obtaining, by the SMF from a PCF, a service profile for the UE
S-1120 executing, at the SMF, the service for the service request in accordance with the service profile obtained for the UE
S-1130

FIG. -11- downloading, from the PCF toward a home SMF, a service profile for the UE, wherein the service profile is usable for the UE executing a service at the home SMF
S-1250

FIG. -12-

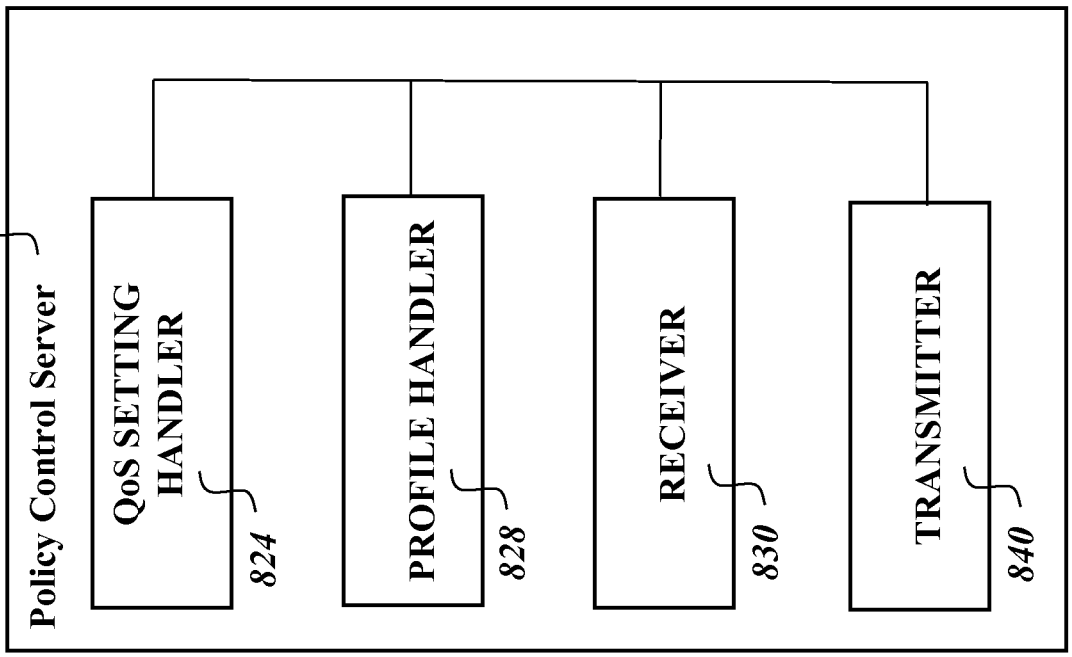
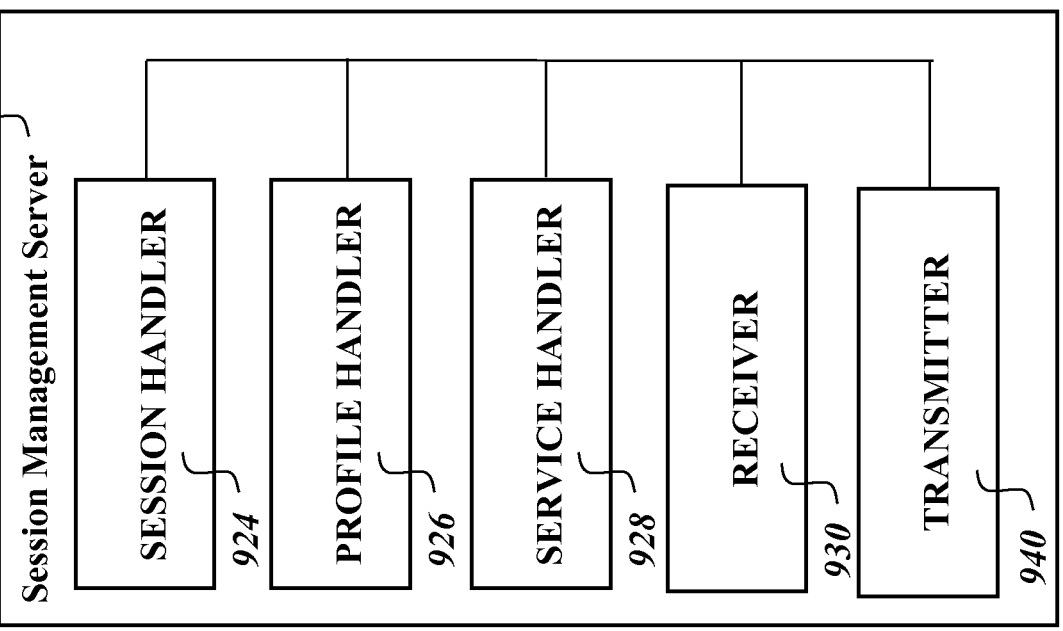

METHODS AND APPARATUSES FOR HANDLING SERVICE PROFILE DATA FOR A USER

CROSS-REFERENCE TO RELATED APPLICATIONS

This application is a Submission Under 35 U.S.C. § 371 for U.S. National Stage Patent Application of International Application Number: PCT/EP2017/055005, filed Mar. 3, 2017 entitled "HANDLING SERVICE PROFILE DATA FOR A USER," the entirety of which is incorporated herein by reference.

TECHNICAL FIELD

The present invention generally relates to subscription profiles handling; and, more specifically, the invention relates to service profiles handling for next generation networks.

BACKGROUND

Subscription data management in 2G/3G/4G systems is based on provisioning and storage of a number of subscription profiles in HSS. For example, the following subscription profiles can be considered for data services (GPRS/EPC): an authentication/security profile, an access (authorization) profile, and a service/session (authorization) profile. In particular, the service/session (authorization) profile may include, amongst others, service/session information applicable to any service that a user equipment (UE) is allowed to execute and the characteristics of each service in terms of packet data network (PDN) type and default quality of service (QoS).

For the sake of simplicity, this service/session (authorization) profile is hereinafter referred to as 'service profile'.

A user can request connection to a 2G/3G/4G system via a serving node, such as e.g. a serving GPRS support node (SGSN) for 2G/3G or a mobility management entity (MME) for 4G, and the serving node can retrieve from the home subscriber server (HSS) the required subscription profiles, as illustrated in FIG. 2.

In this respect, whilst the serving node (SGSN/MME) uses some data of the service profile, a session management function (SMF), such as e.g. a gateway GPRS support node (GGSN) for 2G/3G or a PDN gateway (PDN-GW) for 4G, uses most of the service profile contents.

In these scenarios, as illustrated in FIG. 2, the SMF gets the service profile from the serving node and might use a policy control rules function (PCRF) of a Policy and Charging Control (PCC) architecture, illustrated in FIG. 1, to apply dynamic charging and QoS policies based on a subscription profile, which may be stored in a user data repository (UDR) and be also accessible to the HSS. In particular, the policy and charging enforcement function (PCEF), illustrated in FIG. 1, may reside in a GGSN or in a PDN-GW.

The dynamic policies applied by the PCRF normally override static settings defined in subscription profiles, i.e. dynamic QoS policies defined by the PCRF override default QoS settings provided by the HSS.

On the other hand, 3GPP TR 23.799 v14.0.0 addresses new developments of the core network architecture for the next generation (NG) network, wherein an NG user data management function (NG-UDM, also called unified data management), as an evolution of HSS, and an NG policy control function (NG-PCF), as an evolution of PCRF, are expected to play similar roles for the NG architecture. Likewise, an NG access management function (NG-AMF) and an NG session management function (NG-SMF) respectively correspond to the evolution of SGSM/MME and GGSN/PDN-GW, as illustrated in FIG. 3.

Currently, HSS and PCRF as well as the evolved NG-UDM and NG-PCF could actually store subscription profiles in an external common user data repository (UDR), as illustrated in FIG. 4. Where this is the case, HSS, PCRF, NG-UDM and NG-PCF just include the application logic to access the data in the UDR, and this application logic makes these entities be considered a front-end (FE), respectively called HSS-FE, PCRF-FE, NG UDM-FE, and NG PCF-FE.

Currently, when a user is roaming, the existing profile management model imposes that all profile information is sent from the HSS/NG-UDM in the home PLMN (HPLMN) toward the serving node (SGSN/MME/NG-AMF) in the visited PLMN (VPLMN). However, the NG-SMF for a particular data service may be applied in the VPLMN, what is known as Local Break Out (LBO) roaming, or in the HPLMN, what is known as Home Routed roaming case.

In this situation, when the user is roaming in a VPLMN and the NG-SMF is applied in the HPLMN, the service profile would be transmitted from the NG-UDM in the HPLMN to the NG-AMF in the VPLMN, and from the latter toward the NG-SMF in the HPLMN via the NG-SMF in the VPLMN, as illustrated in FIG. 5.

This issue has been addressed for 5G and NG networks, and 3GPP TR 23.799 proposes a new direct interface NG10, between the NG-UDM and the NG-SMF in the HPLMN, for transmitting the service profile, as illustrated in FIG. 6. This new interface NG10 would not apply in an LBO roaming scenario.

For the sake of simplicity, the NG entities referred above may further be disclosed throughout this specification without being necessarily related to the NG network, i.e. an NG-UDM may be cited as a UDM, an NG-AMF may be cited as an AMF, an NG-PCF may be cited as a PCF, and an NG-SMF may be cited as an SMF. Also for the sake of simplicity, an NG-SMF in the HPLMN may further be referred to as an NG-hSMF, or simply as a home SMF; whereas an NG-SMF in the VPLMN may further be referred to as an NG-vSMF, or simply as a visited SMF.

The introduction of the new interface NG10, even if saving load through signalling interfaces NG11 and NGRC, would necessarily have an impact on the NG-UDM, which should support the new interface NG10 and the logic to correlate the transmissions through the NG8 and the NG10.

Moreover, the NG10 increases the overall signalling and response times at the NG-UDM as a result of interworking with different NG-SMFs, tracking them to notify each NG-SMF of any updates of the service profile.

SUMMARY

The present invention is aimed to at least minimize the above drawbacks and provides for new methods for handling service profile data for a user equipment, UE, in a network wherein the UE has a subscription with a home network, as well as new apparatuses participating in at least some of these methods.

In accordance with a first aspect of the present invention, there is provided an overall method for handling service profile data for a UE in a network wherein the UE has a subscription with a home network.

This method comprises determining, at a user data management function, UDM, and during attach of the UE with the network, a set of data in a service profile for the UE, the set of data being usable to select a session management function, SMF, for executing a service at the home network, hereinafter referred to as a home SMF, and transmitting, from the UDM toward an access and mobility management function, AMF, and receiving at the AMF, the set of data in the service profile for the UE, wherein the set of data is usable to select the home SMF.

Then, this method also comprises selecting, at the AMF upon receiving a session request from the UE and based on the received set of data, the home SMF for executing the service at the home network, and transmitting, from the AMF toward the selected home SMF, and receiving at the home SMF, the session request for the UE.

Also, this method comprises obtaining, at the home SMF from a policy control function, PCF, a service profile for the UE, wherein the service profile is usable for the UE executing a service at the home SMF, and executing, at the home SMF, the service for the service request in accordance with the service profile obtained for the UE.

In an embodiment, this method may further comprise obtaining, by at least one of the UDM and the PCF from a common user data repository, UDR, the service profile for the UE.

In an embodiment of this method, the set of data in the service profile may comprise at least one access point name, APN, authorized for the UE and for which the home SMF is to be selected.

In an embodiment of this method, obtaining the service profile may further comprise transmitting a request for the service profile, from the SMF toward the PCF, and receiving the service profile at the SMF from the PCF.

In an embodiment of this method, obtaining the service profile may further comprise obtaining quality of service, QoS, settings determined at the PCF based on dynamic policies.

In accordance with a second aspect of the present invention, there is provided a method for handling service profile data for a UE in a network wherein the UE has a subscription with a home network, the method carried out at an SMF of the home network, hereinafter referred to as a home SMF.

This method comprises receiving, from an AMF, a session request for executing a service at the home network for the UE, obtaining from a PCF a service profile for the UE, and executing the service for the service request in accordance with the service profile obtained for the UE.

In an embodiment of this method, obtaining the service profile may further comprise obtaining, from the PCF, QoS settings determined at the PCF based on dynamic policies.

In an embodiment of this method, obtaining the service profile may further comprise transmitting a request for the service profile toward the PCF, and receiving the service profile from the PCF.

In accordance with a third aspect of the present invention, there is provided a method for handling service profile data for a UE in a network wherein the UE has a subscription with a home network, the method carried out at a PCF of the home network.

This method comprises downloading, toward an SMF of the home network, hereinafter a home SMF, a service profile for the UE, wherein the service profile is usable for UE executing a service at the home SMF.

In an embodiment, this method may further comprise obtaining, at the PCF from a common UDR, the service profile for the UE.

In an embodiment of this method, downloading the service profile may further comprise downloading quality of service, QoS, settings determined at the PCF based on dynamic policies.

In an embodiment of this method, downloading the service profile may further comprise receiving a request for the service profile, from the home SMF, and transmitting the service profile, toward the home SMF.

In accordance with a fourth aspect of the present invention, there is provided an overall system for handling service profile data for a UE in a network wherein the UE has a subscription with a home network.

This system comprises a first network node implementing a UDM and configured to: determine, during attach of the UE with the network, a set of data in a service profile for the UE, the set of data being usable to select a home SMF for executing a service at the home network; and transmit, toward an AMF, the set of data in the service profile for the UE, wherein the set of data is usable to select the home SMF.

This system also comprises a second network node implementing the AMF and configured to: receive, from the UDM, the set of data in the service profile for the UE, the set of data being usable to select the home SMF; select, upon receiving a session request from the UE and based on the received set of data, the home SMF for executing the service at the home network; and transmit, toward the selected home SMF, the session request for the UE.

This system also comprises a third network node implementing the home SMF and configured to: receive, from the AMF and likely via a visited SMF, the session request for the UE; obtain, from a PCF, a service profile for the UE, wherein the service profile is usable for the UE executing a service at the home SMF; and execute the service for the service request in accordance with the service profile obtained for the UE.

This system also comprises a fourth network node implementing the PCF and configured to download, toward the home SMF, the service profile for the UE, wherein the service profile is usable for the UE executing the service at the home SMF.

In accordance with a fifth aspect of the present invention, there is provided a policy control server implementing a PCF for providing QoS settings for a UE to an SMF in a network wherein the UE has a subscription with a home network.

This policy control server, in an embodiment, may be operable to download, via a transmitter toward an SMF of the home network, hereinafter a home SMF, a service profile for the UE, wherein the service profile is usable for the UE executing a service at the home SMF. To this end, in a sub-embodiment, the policy control server may comprise at least one processor and at least one memory that stores processor-executable instructions, wherein the at least one processor interfaces with the at least one memory to execute the processor-executable instructions, whereby the policy control server is operable to download, via the transmitter toward the home SMF, the service profile for the UE.

In this and other embodiments, the policy control server may further be operable to obtain, via a receiver from a common UDR, the service profile for the UE.

In this and other embodiments, the policy control server may further be operable to download, within or along with the service profile and via the transmitter, QoS settings determined at the policy control server based on dynamic policies.

In this and other embodiments, and in order to download the service profile, the policy control server may further be operable to receive, via the receiver, a request for the service profile from the home SMF, and transmit, via the transmitter, the service profile toward the home SMF.

This policy control server, in another embodiment, may comprise a profile handler configured to download, toward the home SMF via the transmitter, the service profile for the UE, wherein the service profile is usable for the UE executing a service at the home SMF. In this another embodiment, the policy control server may comprise a QoS settings handler configured to download, toward the home SMF via the transmitter, the QoS settings determined at the policy control server based on dynamic policies. In different sub-embodiments, the QoS settings may be downloaded within, or along with, the service profile, and with or without cooperation of the profile handler.

In this another embodiment for the policy control server, the profile handler may further be configured to obtain, via the receiver from the common UDR, the service profile for the UE. Moreover, and in order to download the service profile, the profile handler may further be configured to receive, from the home SMF via the receiver, the request for the service profile, and may further be configured to transmit, toward the home SMF via the transmitter, the service profile for the UE.

In accordance with a sixth aspect of the present invention, there is provided a session management server implementing an SMF for running a service session for a UE in a network wherein the UE has a subscription with a home network.

This session management server, in an embodiment, may be operable to: receive, via a receiver from an AMF, a session request for executing a service at the home network for the UE; obtain, via the receiver from a PCF, a service profile for the UE; and execute the service for the service request in accordance with the service profile obtained for the UE. To this end, in a sub-embodiment, the session management server may comprise at least one processor and at least one memory that stores processor-executable instructions, wherein the at least one processor interfaces with the at least one memory to execute the processor-executable instructions, whereby the session management server is operable to: receive, via the receiver from the AMF, the session request for executing the service at the home network for the UE; obtain, via the receiver from the PCF, the service profile for the UE; and execute the service for the service request in accordance with the service profile obtained for the UE.

In this and other embodiments, the session management server may further be operable to obtain, from the PCF via the receiver within or along with the service profile, QoS settings determined at the PCF based on dynamic policies.

In this and other embodiments, and in order to obtain the service profile, the session management server may further be operable to transmit, via a transmitter, a request for the service profile toward the PCF, and receive, via the receiver, the service profile from the PCF.

This session management server, in another embodiment, may comprise a session handler configured to receive, from the AMF via the receiver, the session request for executing a service at the home network for the UE, a profile handler configured to obtain, from the PCF via the receiver, the service profile for the UE, and a service handler configured to execute the service for the service request in accordance with the service profile obtained for the UE.

In this another embodiment for the session management server, the profile handler may further be configured to obtain, from the PCF via the receiver within or along with the service profile, the QoS settings determined at the PCF based on dynamic policies. Moreover, and in order to obtain the service profile, the profile handler may further be configured to transmit, toward the PCF via the transmitter, the request for the service profile, and may further be configured to receive, from the PCF via the receiver, the service profile.

In accordance with a seventh aspect of the present invention, there is provided at least one computer program comprising instructions which, when executed on at least one processor, cause the at least one processor to carry out at least one of the methods discussed above. There is also provided at least one carrier containing the at least one computer program, wherein the carrier is one of an electronic signal, optical signal, radio signal, or computer readable storage medium. There is also provided at least one tangible, non-transitory computer-readable storage medium, having stored thereon the at least one computer program comprising instructions which, when executed on at least one processor, cause the at least one processor to carry out at least one of the methods discussed above.

BRIEF DESCRIPTION OF THE DRAWINGS

The features, objects and advantages of the invention will become apparent by reading this description in conjunction with the accompanying drawings, in which:

FIG. 1 represents a basic policy and charging control architecture in accordance with 3GPP.

FIG. 2 illustrates a conventional scenario for profiles management in 2G/3G and 4G systems.

FIG. 3 illustrates a baseline architecture for next generation systems.

FIG. 4 illustrates a layered architecture where user data are stored in a user data repository and where the logic to access different user data resides in a number of application Front-Ends.

FIG. 5 illustrates a possible evolution for profiles management in a Home Routed roaming case for 5G systems.

FIG. 6 illustrates an alternative evolution for profiles management in a Home Routed roaming case for 5G systems.

FIG. 7 illustrates an exemplary sequence of actions carried out for profiles management in a Home Routed roaming case for 5G systems, in accordance with an embodiment.

FIG. 8 shows a basic component structure of a policy control server in accordance with an embodiment.

FIG. 9 shows a basic component structure of a session management server in accordance with an embodiment.

FIG. 10 illustrates an exemplary sequence of actions carried out for handling service profile data for a UE in a next generation network, in accordance with an embodiment.

FIG. 11 illustrates an exemplary sequence of actions carried out by the session management server, in accordance with an embodiment, for handling service profile data for a UE in a next generation network.

FIG. 12 illustrates an exemplary sequence of actions carried out by the policy control server, in accordance with an embodiment, for handling service profile data for a UE in a next generation network.

FIG. 13 shows a basic component structure of a session management server in accordance with another embodiment.

FIG. 14 shows a basic component structure of a policy control server in accordance with another embodiment.

DETAILED DESCRIPTION

The following describes currently preferred embodiments of apparatuses and methods for handling service profile data for a UE in a next generation network. More particularly, the following also describes a policy control server, a session management server, and respectively executed methods for handling service profile data for a UE in a next generation network.

In this respect, the following describes embodiments of an overall method for handling service profile data for a UE in a next generation network, as respectively illustrated in FIG. 7 and FIG. 10, a system for carrying out this overall method, and embodiments of specific methods respectively executed at a policy control server and at a session management server for handling service profile data for a UE in a next generation network, which are respectively illustrated in FIG. 11 and FIG. 12.

On the other hand, the apparatuses contributing in handling service profile data for a UE in a next generation network are described in the following with reference to specific implementations of such apparatuses, i.e. a policy control server and a session management server, as respectively illustrated in FIG. 8 and FIG. 9, in one embodiment, and as respectively illustrated in FIG. 14 and FIG. 13, in another embodiment.

In particular, the policy control server illustrated in FIG. 8 and FIG. 14 may be a network node implementing a PCRF 1 of the PCC architecture with reference to FIG. 1, or may be a network node implementing an NG-PCF 11 with reference to e.g. FIG. 5. Also in particular, the session management server illustrated in FIG. 9 and FIG. 13 may be a network node implementing an NG-SMF 23 with reference to e.g. FIG. 3, or may be a network node implementing a NG-hSMF 23b with reference to e.g. FIG. 5.

FIG. 10 illustrates an embodiment of the overall method for handling service profile data for a UE in a network wherein the UE has a subscription with a home network.

In this method, there is a step S-1010 of determining, at a UDM and during attach of the UE with the network, a set of data in a service profile for the UE, the set of data being usable to select an SMF for executing a service at the home network, hereinafter referred to as a home SMF.

In this method, there is a step S-1020 of transmitting, from the UDM toward an AMF, and receiving at the AMF, the set of data in the service profile for the UE, wherein the set of data are usable to select the home SMF.

In this method, there is a step S-1030 of selecting, at the AMF upon receiving a session request from the UE and based on the received set of data, the home SMF for executing the service at the home network.

In this method, there is a step S-1040 of transmitting, from the AMF toward the selected home SMF, and receiving at the home SMF, the session request for the UE.

In this method, there is a step S-1050 of obtaining, at the home SMF from a PCF, a service profile for the UE, the service profile being usable for the UE executing a service at the home SMF; and there is a step S-1060 of executing, at the home SMF, the service for the service request in accordance with the service profile obtained for the UE.

This method may also comprise obtaining, by the UDM from a UDR, the service profile for the UE. This method may further comprise obtaining, by the PCF from a UDR, the service profile for the UE.

In an embodiment, the set of data in the service profile for the UE and usable to select the home SMF may comprise at least one access point name, APN, authorized for the UE and for which the home SMF is to be selected.

In an embodiment, obtaining the service profile at the home SMF from the PCF may further comprise transmitting a request for the service profile, from the SMF toward the PCF, and receiving the service profile at the SMF from the PCF.

In an embodiment, obtaining the service profile at the home SMF may further comprise obtaining QoS settings determined at the PCF based on dynamic policies.

The method discussed above with reference to FIG. 10 can be carried out by a system, which is not completely illustrated in any drawing, for handling service profile data for a UE in a network wherein the UE has a subscription with a home network.

This system comprises a first network node 31 or 32 implementing a UDM, and configured to: determine, during attach of the UE with the network, a set of data in a service profile for the UE, the set of data being usable to select an SMF for executing a service at the home network, hereinafter referred to as a home SMF; and transmit, toward an AMF, the set of data in the service profile for the UE.

This system comprises a second network node 41, 42 or 43 implementing the AMF, and configured to: receive, from the UDM, the set of data in the service profile for the UE, the set of data being usable to select the home SMF; select, upon receiving a session request from the UE and based on the received set of data, the home SMF for executing the service at the home network; and transmit, toward the selected home SMF, the session request for the UE.

This system comprises a third network node 23, 23a or 23b implementing the SMF, and configured to: receive, from the AMF, the session request for the UE; obtain, from a PCF, a service profile for the UE, wherein the service profile is usable for the UE executing a service at the SMF; and execute the service for the service request in accordance with the service profile obtained for the UE.

This system comprises a fourth network node 1 or 11 implementing the PCF, and configured to: download, toward the SMF, the service profile for the UE, wherein the service profile is usable for the UE executing the service at the home SMF.

Aligned with the overall method for handling service profile data for a UE in a network wherein the UE has a subscription with a home network, discussed above with reference to FIG. 10, there is an embodiment of a specific method illustrated in FIG. 11 for handling service profile data for a UE in a network wherein the UE has a subscription with a home network, this specific method carried out at an SMF of the home network.

In this method, there is a step S-1110 of receiving, from an AMF, a session request for executing a service at the home network for the UE. In this method, there is a step S-1120 of obtaining, from a PCF, a service profile for the UE. In this method, there is a step S-1130 of executing, at the SMF, the service for the service request in accordance with the service profile obtained for the UE.

In an embodiment of this method illustrated in FIG. 11, obtaining the service profile may further comprise obtaining QoS settings determined at the PCF based on dynamic policies.

In an embodiment of this method illustrated in FIG. 11, obtaining the service profile may further comprise transmitting a request for the service profile toward the PCF, and receiving the service profile from the PCF.

Aligned with the overall method for handling service profile data for a UE in a network wherein the UE has a subscription with a home network, discussed above with reference to FIG. 10, there is an embodiment of a specific method illustrated in FIG. 12 for handling service profile data for a UE in a network wherein the UE has a subscription with a home network, this specific method carried out at a PCF of the home network.

In this method, there is a step S-1250 of downloading, toward an SMF of the home network, hereinafter a home SMF, a service profile for the UE, wherein the service profile is usable for the UE executing a service at the home SMF.

This method may further comprise obtaining, by the PCF from a UDR, the service profile for the UE.

In an embodiment of this method illustrated in FIG. 12, downloading the service profile may further comprise downloading QoS settings determined at the PCF based on dynamic policies.

In an embodiment of this method illustrated in FIG. 12, downloading the service profile may further comprise receiving a request for the service profile from the home SMF, and transmitting the service profile toward the home SMF.

Regarding the service profile data to be handled, there may be two different sets of data: data at UE level, and data at Access Point Name (APN) level. The APN identifies a PDN that a UE can communicate with and, in addition, may define a type of service that is provided by the PDN.

The service profile data at UE level, which is relevant for any service executed by the UE at any SMF instance, is transmitted as illustrated in FIG. 6, from the NG-UDM 32 to the NG-AMF 43 through the NG8 reference point. The service profile data at UE level may comprise one or more UE identifiers (e.g. IMSI/MSISDN/IMEI), charging characteristics, a list of authorized APN identifiers for the UE and, for each authorized APN identifier, an indication (e.g. VPAA flag) on whether an SMF is allowed to be selected in the VPLMN or is not. The service profile data at UE level is used by the NG-AMF 43 in selecting a visited SMF, such as NG-vSMF 23a, or a home SMF, such as NG-hSMF 23b, to execute a service for the UE.

The service profile data at APN level, which is relevant for the execution of the requested service (as defined by the APN identifier) at a selected SMF, may be transmitted as illustrated in FIG. 6 from the NG-UDM 32 to the NG-hSMF 23b through the NG10 reference point, as currently suggested by 3GPP.

However, embodiments further discussed in this specification propose the home SMF obtaining the service profile data at APN level, hereinafter simply referred to as the service profile, from a PCF. In some embodiments, this service profile obtained at the home SMF from the PCF may also include the service profile data at UE level.

For example, in the embodiment illustrated in FIG. 6, a home SMF like the NG-hSMF 23b may obtain the service profile from the NG-PCF 11 via the NG7 reference point. Likewise, in the embodiment illustrated in FIG. 2, a home SMF like the GGSN 21 or the PDN-GW 22 may obtain the service profile from the PCRF 1 via the Gx reference point.

In these two embodiments, wherein the home SMF obtains the service profile from the PCF, this service profile may comprise relevant data for executing at the home SMF a service for the UE, such as e.g. an APN, PDN type, PDN address, a subscribed QoS profile and PDN subscribed charging characteristics, as disclosed in 3GPP TS 23.401, and such as e.g. one or more session and service continuity (SSC) modes and a branching point, as disclosed in TR 23.799. In addition, as commented above, this service profile may also include some or all the service profile data at UE level.

FIG. 7 illustrates an embodiment of the overall method for handling service profile data for a UE in a next generation network. In this method, an NG-AMF 43 receives an attach request from a UE 72 with a UE identifier during step S-705.

After a successful user authentication during step S-710, the NG-AMF 43 transmits during step S-715 a message toward the UDM 32 with the user identifier and an identifier of the AMF or VPLMN. This message may be equivalent or similar as an Update Location request used in previous generations networks. The UDM 32 may perform an access authorization based on a user location identified by the identifier of the AMF or VPLMN.

The UDM 32, after successful access authorization and during step S-720, may fetch service profile data for the AMF from a UDR 8, if not available at the UDM. As discussed above, the service profile data for the AMF may correspond to the service profile data at UE level. The UDM 32 may prepare the service profile data to be downloaded toward the AMF based on the type of APN and VPLMN the user is accessing.

In this respect, for an APN for which a visited SMF is allowed (VPAA flag set as true within APN configuration) the UDM 32 may provide the whole service profile, i.e. both service profile data at UE level and service profile data at APN level, toward the NG-AMF 43 during step S-725, the NG-AMF completes the attach during step S-730 and, not illustrated in any drawing, the NG-AMF 43 would transmit the received service profile data at APN level toward the visited SMF 23a, if applicable.

However, in accordance with embodiments of the invention, for an APN for which only a home SMF is allowed (VPAA flag set as false within APN configuration) the UDM 32 only provides the service profile data at UE level toward the NG-AMF 43 during step S-725, and the NG-AMF completes the attach during step S-730.

Upon receiving during step S-735 a session request from a UE 72 with an APN identifier, the NG-AMF 43 selects a home SMF 23b to execute the corresponding service for the UE, based on the service profile data at UE level received from the UDM 32 and based on the APN identifier received from the UE 72. Then, during step S-740, the NG-AMF 43 transmits the received session request for the UE toward the selected home SMF 23b.

The home SMF 23b may transmit during step S-745 a request for a service profile for the UE toward a PCF 11 and receive during step S-755 a response with the service profile for the UE from the PCF 11. This service profile for the UE comprises the service profile data at APN level and may also comprise the service profile data at UE level.

In an embodiment where the service profile for the UE is not available at the PCF, the PCF may fetch during step S-750 the service profile for the UE from a UDR 8.

In an embodiment, prior to transmitting the response with the service profile, the PCF may determine QoS settings for the session, based on dynamic policies at the PCF, and may transmit these QoS settings toward the home SMF within or along with the service profile.

The home SMF 23b may execute the service for the service request, in accordance with the service profile received for the UE, and may complete the session request toward the NG-AMF 43 during step S-780. The NG-AMF 43 may then complete the session request toward the UE 72 during step S-785.

Participating in the embodiments of the methods for handling service profile data for a UE in a network wherein the UE has a subscription with a home network, discussed above with reference to FIG. 10, FIG. 11, FIG. 12 and FIG. 7, there are a policy control server 11 or 1, which implements a PCF for providing QoS settings for a UE toward an SMF, and a session management server 23, 23*a* or 23*b*, which implements an SMF for running a service session for a UE in a network wherein the UE has a subscription with a home network.

In accordance with an embodiment illustrated on FIG. 8, the policy control server 11 or 1 may comprise at least one processor 820, and at least one memory 810 that stores processor-executable instructions 814. In this policy control server, the at least one processor interfaces with the at least one memory to execute the processor-executable instructions, whereby the policy control server is operable to perform the actions disclosed in the following.

The policy control server 11 or 1 is thus operable to download, via a transmitter 840 toward an SMF of the home network, hereinafter a home SMF, a service profile for the UE, wherein the service profile is usable for the UE executing a service at the home SMF.

In an embodiment, this policy control server 11 or 1 may further be operable to obtain, via a receiver 830 from a common UDR, the service profile for the UE.

In an embodiment, this policy control server 11 or 1 may further be operable to download, within or along with the service profile and via the transmitter 840, QoS settings determined at the policy control server based on dynamic policies.

In an embodiment and in order to download the service profile, this policy control server 11 or 1 may further be operable to receive, via the receiver 830, a request for the service profile from the home SMF, and transmit, via the transmitter 840, the service profile toward the home SMF.

In particular, a profile handler 828 running in a processor 820 may handle the download, via the transmitter 840 toward the home SMF, of the service profile for the UE, wherein the service profile is usable for the UE executing a service at the home SMF.

Also in particular, a QoS settings handler 824 running in a processor 820 may handle the download, via the transmitter 840 toward the home SMF, of the QoS settings determined at the policy control server based on dynamic policies. In different embodiments, the QoS settings may be downloaded within, or along with, the service profile, and with or without cooperation of the profile handler 828.

In an embodiment, the profile handler 828 may further obtain, via the receiver 830 from the common UDR, the service profile for the UE.

In an embodiment and in order to download the service profile, the profile handler 828 may further receive, from the home SMF via the receiver 830, the request for the service profile, and may further transmit, toward the home SMF via the transmitter 840, the service profile.

If required at all, the policy control server 11 or 1 may be complemented with a data section 818 in memory to store any one of service profile and QoS settings for a UE, as well as associations thereof.

The policy control server 11 or 1 illustrated in FIG. 8 may thus comprise the at least one processor 820 and the at least one memory 810, both in communication with each other, with the QoS settings handler 824, the profile handler 828, the receiver 830 and the transmitter 840, and with other elements or units of the policy control server 11 or 1. The at least one memory 810 may comprise volatile and/or non-volatile memory. In particular, the at least one memory 810 may have a computer program 814 and data 818 stored therein. The computer program 814 may be loaded in the at least one memory 810 from a computer program product 850, such as any non-transitory computer readable medium, in which the computer program is stored. The data 818 may comprise any one of service profile and QoS settings for a UE, as well as associations thereof. The at least one processor 820 may be configured to carry out the functions of the QoS settings handler 824 and the profile handler 828.

In accordance with an embodiment illustrated on FIG. 9, the session management server 23, 23*a* or 23*b* may comprise at least one processor 920, and at least one memory 910 that stores processor-executable instructions 914. In this session management server, the at least one processor interfaces with the at least one memory to execute the processor-executable instructions, whereby the session management server is operable to perform the actions disclosed in the following.

The session management server 23, 23*a* or 23*b* is thus operable to receive, from an AMF via a receiver 930, a session request for executing a service at the home network for the UE. This session management server is also operable to obtain, from a PCF via the receiver 930, a service profile for the UE and execute the service for the service request in accordance with the service profile obtained for the UE.

In an embodiment, this session management server 23, 23*a* or 23*b* may further be operable to obtain, from the PCF via the receiver 930 within or along with the service profile, QoS settings determined at the PCF based on dynamic policies.

In an embodiment and in order to obtain the service profile, the session management server 23, 23*a* or 23*b* may further be operable to transmit, toward the PCF via a transmitter 940, a request for the service profile, and receive, from the PCF via the receiver 930, the service profile.

In particular, a session handler 924 running in a processor 920 may receive, from the AMF via the receiver 930, the session request for executing a service at the home network for the UE; a profile handler 926 running in a processor 920 may obtain, from the PCF via the receiver 930, the service profile for the UE; and a service handler 928 running in a processor 920 may execute the service for the service request in accordance with the service profile obtained for the UE.

In an embodiment, the profile handler 926 may further obtain, from the PCF via the receiver 930 within or along with the service profile, the QoS settings determined at the PCF based on dynamic policies.

In an embodiment and in order to obtain the service profile, the profile handler 926 may further transmit, toward the PCF via the transmitter 940, the request for the service profile, and may further receive, from the PCF via the receiver 930, the service profile.

If required at all, the session management server 23, 23*a* or 23*b* may be complemented with a data section 918 in memory to store any one of session data, service data, service profile and QoS settings for a UE, as well as associations thereof.

The session management server 23, 23*a* or 23*b* illustrated in FIG. 9 may thus comprise the at least one processor 920 and the at least one memory 910, both in communication with each other, with the session handler 924, the profile handler 926, the service handler 928 the receiver 930 and the transmitter 940, and with other elements or units of the session management server 23, 23*a* or 23*b*. The at least one memory 910 may comprise volatile and/or non-volatile memory. In particular, the at least one memory 910 may have a computer program 914 and data 918 stored therein. The computer program 914 may be loaded in the at least one memory 910 from a computer program product 950, such as any non-transitory computer readable medium, in which the computer program is stored. The data 918 may comprise any one of session data, service data, service profile and QoS settings for a UE, as well as associations thereof. The at least one processor 920 may be configured to carry out the functions of the session handler 924, the profile handler 926 and the service handler 928.

In accordance with another embodiment illustrated on FIG. 14, the policy control server 11 or 1 may comprise a profile handler 828 configured to download, toward the home SMF via the transmitter 840, the service profile for the UE, wherein the service profile is usable for the UE executing a service at the home SMF. In an embodiment, the policy control server 11 or 1 may also comprise a QoS settings handler 824 configured to download, toward the home SMF via the transmitter 840, the QoS settings determined at the policy control server based on dynamic policies. In different embodiments, the QoS settings may be downloaded within, or along with, the service profile, and with or without cooperation of the profile handler 828.

As for the embodiment illustrated with reference to FIG. 8, also in this embodiment illustrated on FIG. 14, the profile handler 828 may further be configured to obtain, via the receiver 830 from the common UDR, the service profile for the UE. Moreover, and in order to download the service profile, the profile handler 828 may further be configured to receive, from the home SMF via the receiver 830, the request for the service profile, and may further be configured to transmit, toward the home SMF via the transmitter 840, the service profile.

In accordance with another embodiment illustrated on FIG. 13, the session management server 23, 23a or 23b may comprise a session handler 924 configured to receive, from the AMF via the receiver 930, the session request for executing a service at the home network for the UE, a profile handler 926 configured to obtain, from the PCF via the receiver 930, the service profile for the UE, and a service handler 928 configured to execute the service for the service request in accordance with the service profile obtained for the UE.

As for the embodiment illustrated with reference to FIG. 9, also in this embodiment illustrated on FIG. 13, the profile handler 926 may further be configured to obtain, from the PCF via the receiver 930 within or along with the service profile, the QoS settings determined at the PCF based on dynamic policies. Moreover, and in order to obtain the service profile, the profile handler 926 may further be configured to transmit, toward the PCF via the transmitter 940, the request for the service profile, and may further be configured to receive, from the PCF via the receiver 930, the service profile.

The invention may also be practiced by at least one computer program comprising instructions which, when executed on at least one processor, cause the at least one processor to carry out at least one of the methods discussed above. For example, the computer program 814 running in the processor 820, as illustrated in FIG. 8, and implementing the method carried out by the policy control server; and/or the computer program 914 running in the processor 920, as illustrated in FIG. 9, and implementing the method carried out by the session management server.

There is also provided at least one carrier containing the at least one computer program, wherein the carrier is one of an electronic signal, optical signal, radio signal, or computer readable storage medium. For example, the carrier 850 as illustrated in FIG. 8 and/or the carrier 950 as illustrated in FIG. 9

There is also provided at least one tangible, non-transitory computer-readable storage medium, having stored thereon the at least one computer program comprising instructions which, when executed on at least one processor, cause the at least one processor to carry out at least one of the methods discussed above. For example, the computer-readable storage medium 814 with the processor 820, as illustrated in FIG. 8, implementing the method carried out by the policy control server; and/or the computer-readable storage medium 914 with the processor 920, as illustrated in FIG. 9, implementing the method carried out by the session management server.

As used throughout the present specification, the word "comprising" does not exclude the presence of other elements or steps than those listed and the words "a" or "an" preceding an element do not exclude the presence of a plurality of such elements.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method for handling service profile data for a user equipment (UE) in a network, the UE having a subscription with a home network, the method comprising:
   determining, at a user data management function (UDM), and during attachment of the UE with the network, a set of data in a service profile for the UE, the set of data being usable to select a session management function (SMF) for executing a service at the home network (home SMF);
   transmitting, from the UDM toward an access and mobility management function (AMF), and receiving at the AMF, the set of data in the service profile for the UE;
   selecting, at the AMF upon receiving a session request from the UE and based on the received set of data, the home SMF for executing the service at the home network, wherein the set of data in the service profile for the UE comprises at least one access point name (APN) authorized for the UE and for which the home SMF is to be selected;
   transmitting, from the AMF toward the selected home SMF, and receiving at the home SMF, the session request for the UE;
   obtaining, at the home SMF from a policy control function (PCF), the set of data in the service profile for the UE, the set of data in the service profile being usable for executing the service for the UE at the home SMF; and
   executing, at the home SMF, the service for the session request in accordance with the set of data in the service profile obtained for the UE.

2. The method of claim 1, wherein the method further comprises obtaining, by at least one of the UDM and the PCF from a common user data repository (UDR), the service profile for the UE.

3. The method of claim 1, wherein obtaining the set of data in the service profile for the UE further comprises transmitting a request for the service profile, from the home SMF toward the PCF, and receiving the service profile at the home SMF from the PCF.

4. The method of claim 1, wherein obtaining the set of data in the service profile for the UE further comprises obtaining quality of service (QoS) settings determined at the PCF based on dynamic policies.

5. A method for handling service profile data for a user equipment (UE) in a network, the UE having a subscription with a home network, the method carried out at a session management function (SMF) of the home network (home SMF) and comprising:
    receiving, from an access and mobility management function (AMF), a session request for executing a service at the home network for the UE;
    obtaining, from a policy control function (PCF), a set of data in a service profile for the UE, wherein the set of data in the service profile for the UE comprises at least one access point name (APN) authorized for the UE and for which the home SMF is selected; and
    executing the service for the session request in accordance with the set of data in the service profile obtained for the UE.

6. The method of claim 5, wherein obtaining the set of data in the service profile for the UE further comprises obtaining, from the PCF, quality of service (QoS) settings determined at the PCF based on dynamic policies.

7. The method of claim 5, wherein obtaining the set of data in the service profile for the UE further comprises transmitting a request for the service profile toward the PCF, and receiving the service profile from the PCF.

8. A method for handling service profile data for a user equipment (UE) in a network, the UE having a subscription with a home network, the method carried out at a policy control function (PCF) of the home network and comprising:
    downloading, toward a session management function (SMF) of the home network (home SMF), at least a set of data in a service profile for the UE, the service profile being usable for executing a service for the UE at the home SMF, wherein at least the set of data in the service profile for the UE comprises at least one access point name (APN) authorized for the UE and for which the home SMF is selected.

9. The method of claim 8, wherein the method further comprises obtaining, at the PCF from a common user data repository (UDR), the service profile for the UE.

10. The method of claim 8, wherein downloading at least the set of data in the service profile for the UE further comprises downloading quality of service (QoS) settings determined at the PCF based on dynamic policies.

11. The method of claim 8, wherein downloading at least the set of data in the service profile for the UE further comprises receiving a request for the service profile from the home SMF, and transmitting the service profile toward the home SMF.

12. A policy control server implementing a policy control function (PCF) for providing quality of service (QoS) settings for a user equipment (UE) to a session management function (SMF) in a network, the UE having a subscription with a home network, the policy control server configured to:
    download, via a transmitter toward an SMF of the home network (home SMF), at least a set of data in a service profile for the UE, the service profile being usable for executing a service for the UE at the home SMF, wherein at least the set of data in the service profile for the UE comprises at least one access point name (APN) authorized for the UE and for which the home SMF is selected.

13. The policy control server of claim 12, further configured to obtain, via a receiver from a common user data repository (UDR), the service profile for the UE.

14. The policy control server of claim 12, further configured to download, one of within and along with at least the set of data in the service profile for the UE and via the transmitter, the QoS settings determined at the policy control server based on dynamic policies.

15. The policy control server of claim 12, wherein in order to download at least the set of data in the service profile for the UE, the policy control server is further operable to receive, via a receiver, a request for the service profile from the home SMF, and transmit, via the transmitter, the service profile toward the home SMF.

16. A session management server implementing a session management function (SMF) for running a service session for a user equipment (UE) in a network, the UE having a subscription with a home network, the session management server configured to:
    receive, via a receiver from an access and mobility management function (AMF), a session request for executing a service at the home network for the UE;
    obtain, via the receiver from a policy control function (PCF), a set of data in a service profile for the UE, wherein the set of data in the service profile for the UE comprises at least one access point name (APN) authorized for the UE and for which the SMF is selected; and
    execute the service for the session request in accordance with the set of data in the service profile obtained for the UE.

17. The session management server of claim 16, further configured to obtain, from the PCF via the receiver, one of within and along with the set of data in the service profile for the UE, quality of service (QoS) settings determined at the PCF based on dynamic policies.

18. The session management server of claim 16, wherein in order to obtain the set of data in the service profile for the UE, the session management server is further configured to transmit, via a transmitter, a request for the service profile toward the PCF, and receive, via the receiver, the service profile from the PCF.

* * * * *